United States Patent
Valle Gomez et al.

(10) Patent No.: US 11,827,465 B1
(45) Date of Patent: Nov. 28, 2023

(54) SELF-BALANCING FILLING SYSTEM

(71) Applicant: Amazon Technologies, Inc., Seattle, WA (US)

(72) Inventors: German Valle Gomez, Viladecavalls (ES); Gines Garcia Garcia, Murcia (ES)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 17/398,837

(22) Filed: Aug. 10, 2021

(51) Int. Cl.
*B65G 65/32* (2006.01)
*B65G 65/00* (2006.01)
*B65G 47/44* (2006.01)
*B65G 43/08* (2006.01)
*B65G 11/20* (2006.01)

(52) U.S. Cl.
CPC ............ *B65G 65/32* (2013.01); *B65G 11/203* (2013.01); *B65G 43/08* (2013.01); *B65G 47/44* (2013.01); *B65G 65/005* (2013.01)

(58) Field of Classification Search
None
See application file for complete search history.

(56) References Cited

U.S. PATENT DOCUMENTS

| | | | | |
|---|---|---|---|---|
| 1,886,295 A | * | 11/1932 | Morris ................. | B65G 69/165 34/95 |
| 2,529,843 A | * | 11/1950 | Kehrer .................... | B01J 8/082 137/340 |
| 3,481,496 A | * | 12/1969 | Buschbom ............. | A01F 25/186 193/3 |
| 3,565,268 A | * | 2/1971 | Buschbom ............. | A01F 25/186 193/17 |
| 3,732,961 A | * | 5/1973 | Thornton ............. | B65G 69/165 193/15 |
| 3,734,313 A | * | 5/1973 | Gauthier ................ | B65G 47/00 222/64 |
| 3,858,733 A | * | 1/1975 | Morioka ................ | B65G 47/00 193/30 |
| 3,891,080 A | * | 6/1975 | Neises ................. | B65G 11/203 198/531 |
| 4,252,485 A | * | 2/1981 | Propster .................. | C03B 3/023 414/160 |
| 4,397,423 A | * | 8/1983 | Beaver ............... | B65G 69/0458 414/301 |
| 4,754,869 A | * | 7/1988 | Hutchison .............. | B65G 47/20 239/666 |

(Continued)

FOREIGN PATENT DOCUMENTS

| | | | | |
|---|---|---|---|---|
| EP | 1900655 A2 | * | 3/2008 | ........... B65G 11/203 |
| KR | 20040051486 A | * | 6/2004 | |

(Continued)

*Primary Examiner* — Joseph A Dillon, Jr.
(74) *Attorney, Agent, or Firm* — Kilpatrick Townsend & Stockton LLP

(57) ABSTRACT

A distribution device can be used to distribute items in a container. The items can fall off of a chute into the interior of the container. Some of the items may contact the distribution device. The items that contact the distribution can have their trajectories changed prior to falling into the container. The distribution device can more evenly distribute the items in the container than in the absence of the distribution device.

20 Claims, 9 Drawing Sheets

(56) References Cited

U.S. PATENT DOCUMENTS

| | | | | |
|---|---|---|---|---|
| 4,995,499 A * | 2/1991 | Berquist | ............ | B65G 11/206 193/29 |
| 5,048,666 A * | 9/1991 | Huggins, Sr. | ......... | B65G 69/16 198/534 |
| 5,092,267 A * | 3/1992 | Hajek | ................... | B05B 7/1477 222/413 |
| 5,340,211 A * | 8/1994 | Pratt | ...................... | B01F 35/71 366/152.2 |
| 5,403,141 A * | 4/1995 | Rauser | ............... | B65G 69/0458 414/301 |
| 5,911,667 A * | 6/1999 | Sanchis | ............... | B65G 11/086 198/534 |
| 6,315,159 B1 * | 11/2001 | Paczkowski | ........... | G07F 11/16 221/312 R |
| 6,634,485 B1 * | 10/2003 | Cailbault | ............ | B65G 11/203 198/417 |
| 6,971,495 B2 * | 12/2005 | Hedrick | ................ | B65D 88/28 52/197 |
| 8,876,439 B2 * | 11/2014 | Sheehan | ............... | B01J 8/0015 198/534 |
| 9,199,762 B1 * | 12/2015 | Russell | ................ | B65D 81/05 |
| 9,387,982 B1 * | 7/2016 | Corey, Jr. | ............ | B65G 11/203 |
| 10,919,702 B1 * | 2/2021 | Berta | .................... | F16M 11/22 |
| 11,027,923 B1 * | 6/2021 | Mohammed | ........ | B65G 11/081 |
| 2004/0182673 A1 * | 9/2004 | Baller | ................ | B65G 11/166 193/27 |
| 2011/0091292 A1 * | 4/2011 | Bryan, Jr. | ............. | B65G 69/16 406/197 |
| 2015/0191310 A1 * | 7/2015 | Benjamin | ........... | B65G 11/166 703/1 |
| 2016/0304294 A1 * | 10/2016 | Akimoto | ........... | B65G 11/203 |
| 2017/0334647 A1 * | 11/2017 | Hartmann | ........... | B65G 11/023 |
| 2017/0334648 A1 * | 11/2017 | Hartmann | ........... | B65G 11/02 |
| 2018/0162644 A1 * | 6/2018 | Vitalini | ............... | B65G 11/203 |
| 2022/0097973 A1 * | 3/2022 | Grafe | .................... | B65G 65/32 |
| 2023/0211960 A1 * | 7/2023 | Costanzo | ........... | B65G 47/5127 198/370.01 |

FOREIGN PATENT DOCUMENTS

| | | | | |
|---|---|---|---|---|
| KR | 2015069292 A | * | 6/2015 | ............ B65G 11/20 |
| KR | 101635877 B1 | * | 4/2016 | |
| KR | 101717164 B1 | * | 3/2017 | |

\* cited by examiner

SELF-BALANCING FILLING SYSTEM

BACKGROUND

Modern inventory systems, such as those in mail order warehouses, supply chain distribution centers, airport luggage systems, and custom-order manufacturing facilities, face significant challenges in responding to requests for inventory items. The items can be moved around the warehouse environment and deposited in bulk containers. The bulk containers may be loaded unevenly which may cause issues with efficiency or predictability of operations.

BRIEF DESCRIPTION OF THE DRAWINGS

Various embodiments in accordance with the present disclosure will be described with reference to the drawings, in which.

DETAILED DESCRIPTION

Figure 1:
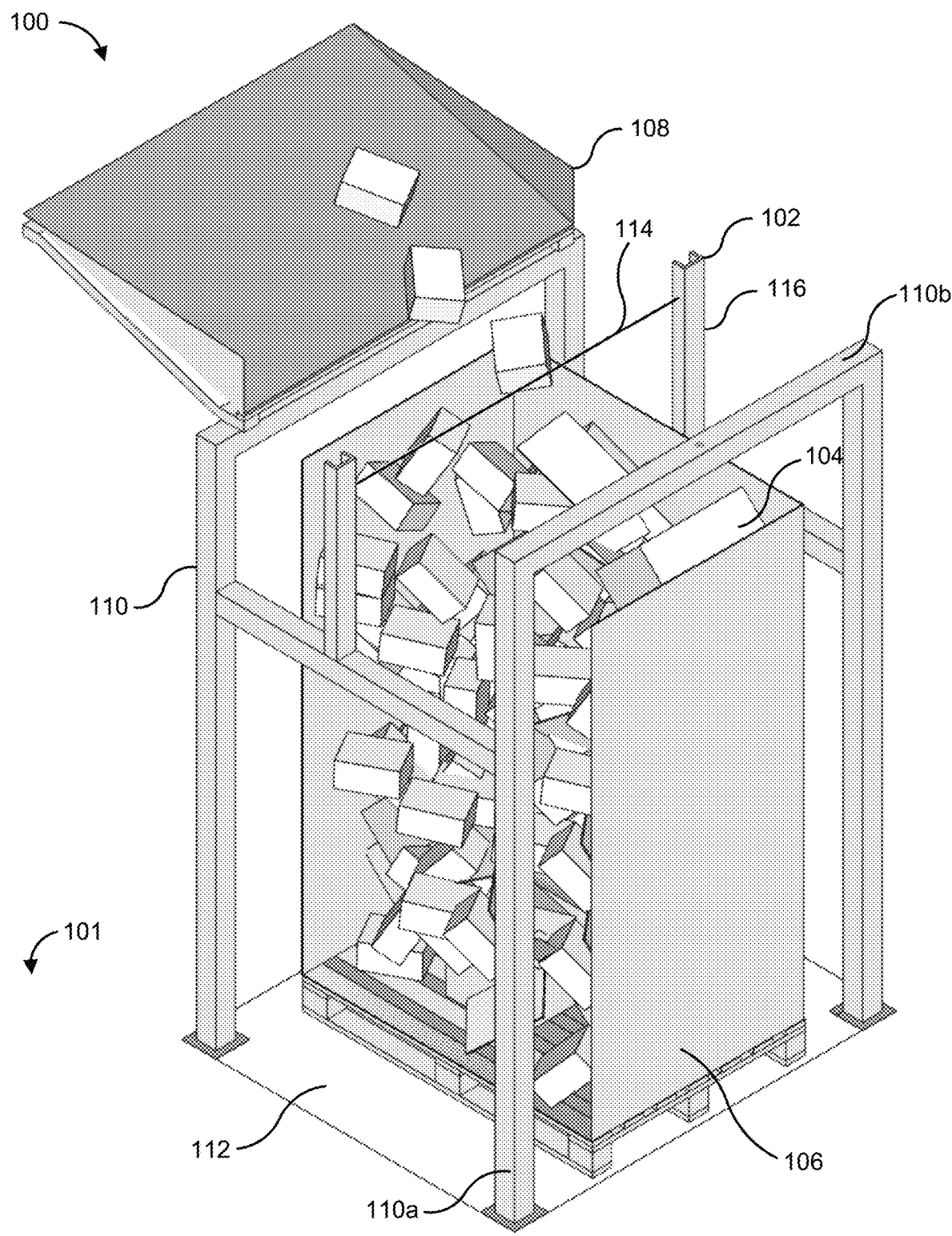
FIG. 1 illustrates a container filling system including a distribution device which can evenly distribute items in the container, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a container filling system for filling containers with items. The techniques described herein may be implemented by any suitable container management system, but particular examples are described that include an item distribution device. The item distribution device can evenly distribute items that are being loaded into the container. In various embodiments, the techniques described herein may include automation of portions of a process for distributing items being loaded in a container.

Turning now to a particular example, in this example, a container filling system can include an item distribution device. The item distribution device can operate relative to items that can be deposited into the container using a chute. The container can be positioned such that items fall off of the chute along various trajectories and land into the container. The item distribution device can be positioned above the container such that a portion of the items falling from the chute contact the item distribution device. The item distribution device can change the trajectories of the items such that they fall into the container. The change in trajectories can cause the items to land in a different area of the container than they would have landed in if their trajectories had not been changed. Causing the items to land in different areas of the container can allow items to be evenly distributed within the container, for example.

Items can be deposited in the container until the container is full (e.g., the items have reached or almost reached the top of the container). A sensor can be used to detect data associated with the height of the items in the container and that data can be used to determine when the container is full. The full container can be removed and replaced with any empty container. Overall, the item distribution device may cause items to spread out within respective containers and avoid piling up or accumulating along a side by the sensor that may otherwise prematurely trigger a full sensor reading and lead to incompletely full containers being removed and replaced.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

While exemplary embodiments are described with reference to containers and the like, the systems and techniques described herein are also applicable to any other items and/or suitable packaging containers (e.g., carts, bags, boxes, gaylord boxes, bins, totes, envelopes, pouches, sacks, jugs, and other similar containers).

Turning now to the figures, FIG. 1 illustrates a container filling system 100 including a distribution device 102 which can distribute items 104 in containers 106. The distribution device 102 may distribute the items 104 evenly in the containers 106, for example. The container filling system 100 can be positioned in a warehouse environment 101, for example, where items 104 are moved, processed, sorted, and/or stored. The items 104 can be deposited in the containers 106 using a chute 108. The chute 108 may be attached to, adjacent, or otherwise associated with a support structure 110 (e.g., a frame). The chute 108 can be arranged at a height that allows containers 106 to be positioned below the chute 108, for example, to receive items 104 into the interior of the containers 106. For example, the chute 109 and/or the support structure 110 can have a height that is greater than the height of the containers 106. In various embodiments, the containers 106 can be positioned in a container receiving area 112 and receive the items 104 from the chute 108.

The chute 108 can receive the items 104 (e.g., from a conveyance system). The items 104 can move from the top of the chute 108 to the bottom of the chute 108. For example, the chute 108 can be angled such that the items 104 slide from the top of the chute 108 to the bottom of the chute 108. The items 104 can leave the bottom of the chute 108 at various trajectories and fall into a container 106 (e.g., into an interior of the container 106). The trajectories of the items 104 can vary depending on the size, shape, weight, and/or the speed at which the items 104 moves from the top to the bottom of the chute 108.

The trajectories of some of the items 104 can cause those items 104 to contact the distribution device 102. The distribution device 102 can be attached to the support structure 110 such that a portion of the distribution device 102 is positioned above the containers 106 (e.g., when the containers 106 are positioned in the container receiving area 112).

In various embodiments, the distribution device 102 can include a flexible member 114 (e.g., an elastic member) extending between supports 116. The flexible member 114 can be positioned above the containers 106 such that the flexible member 114 intersects some of the trajectories of the items 104. The flexible member 114 can have a neutral position (e.g., a position the flexible member is prior to an item contacting the flexible member 114). The flexible member 114 can flex away from the chute 108 (e.g., in response to items 104 contacting the flexible member 114). For example, the flexible member 114 can flex until the flexible member 114 reaches a maximum flexion. The flexible member 114 can flex toward the chute 108 (e.g., after reaching a maximum flexion) and can cause the items 104 to fall into the container 106. The flexible member 114 can return to the neutral position after flexing.

The items 104 with trajectories that do not intersect the flexible member 114 can continue to fall into the interior of the container 106. The items 104 with trajectories that are intersected by the flexible member 114 can contact the flexible member 114. The items 104 that contact the flexible member 114 can be deflected before landing in the container 106. For example, as discussed further herein, the items 104 can have a first trajectory prior to contacting the flexible member 114 and a second, different trajectory after contacting the flexible member 114. The change in the trajectory can cause the items 104 to land in a different area of the containers 106 than they otherwise would have if the trajectory had not been changed.

Figure 2:
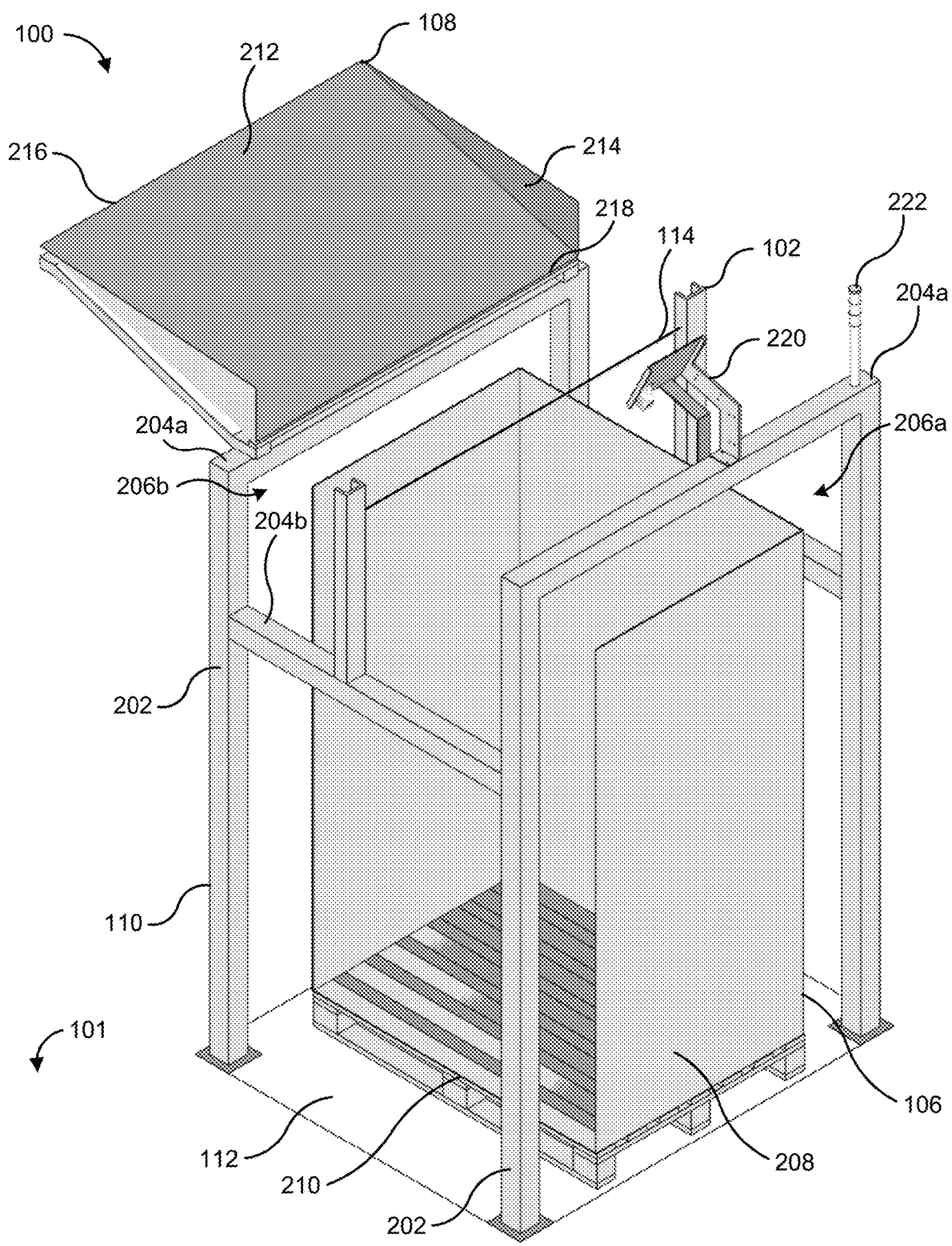
FIG. 2 illustrates the container filling system of FIG. 1 including additional components, in accordance with various embodiments.

The components described in reference to FIG. 1 can include various features which can facilitate the filling of the containers 106 with the items 104. An example of components which may be utilized with the container filling system 100 is shown in FIG. 2. The components are shown in isolation from the items 104 for ease of viewing.

As shown by way of example in FIG. 2, the container filling system 100 can include a distribution device 102 and a chute 108 attached to a support structure 110. The support structure can 110 can include vertical supports 202 which are connected by horizontal supports 204 (e.g., individually labeled 204a and 204b). The horizontal supports 204 can be positioned at a height that is greater than the maximum height of the containers 106 (e.g., as depicted by horizontal supports 204a). However, some of the horizontal supports 204 can be positioned at a height below the height of the container 106 (e.g., as depicted by horizontal supports 204b). The support structure 110 can be fixed in place (e.g., secured to the ground) or may be moveable around the warehouse environment 101. For example, the vertical supports 202 can include wheels and/or a propulsion device which can be used to move the support structure around the warehouse environment 101. The support structure 110 can be or include metal (e.g., aluminum or steel), carbon fiber, plastic, 3D printed material, and/or any material with suitably high strength for supporting associated parts.

The support structure 110 can be at least partially positioned within a container receiving area 112. For example, one or more of the vertical supports 202 can be positioned within the container receiving area 112. The support structure 110 can be positioned such that containers 106 are positioned below the upper portion of the support structure 110 (e.g., below horizontal supports 204).

The containers 106 can be positioned in a container receiving area 112. In the container receiving area 112, the containers 106 can be aligned with the chute 108 for receiving items 104. The container receiving area 112 can include a proximal side (e.g., a side closest to the chute 108) and a distal side (e.g., a side furthest away from the chute 108). The container receiving area 112 can include a visible boundary (e.g., designated by markings and/or insignia). However, the container receiving area 112 may have an invisible boundary (e.g., may be the area between the vertical supports 202). In some embodiments, the container receiving area 112 can include markings and/or insignia to aid in alignment of the containers 106 with the chute 108. For example, the container receiving area 112 can include markings for alignment with a center or other reference feature of the containers 106.

In various embodiments, the support structure 110 can include one or more openings 206 (e.g., individually labeled as 206a and 206b) which can be used to position the container 106 in the container receiving area 112. For example, the vertical supports 202 and the horizontal supports 204 can form the opening 206a where the containers 106 can be moved into and/or out of container receiving area 112. In some embodiments, the support structure 110 can include multiple openings 206. A first opening 206a can be used to position empty containers 106 in the container receiving area 112 and a second opening 206b can be used to remove the filled containers 106 from the container receiving area 112, for example. However, either of the openings 206a, 206b may be used to position the empty containers 106 in the container receiving area 112 or remove the filled containers from the container receiving area 112.

The containers 106 can be or include a rigid or semi-rigid structure with an interior area that can receive the items 104. The containers 106 can include cardboard, plastic, wood, mesh, metal, carbon fiber, 3D printed material, and/or any suitable rigid or semi-rigid material.

The containers 106 can include sidewalls 208, a base 210, and one or more open sides. For example, the containers 106 can include an open top for receiving the items 104. Although one side wall 208 is omitted from the depiction for ease of viewing, the sidewalls 208 may be arranged fully around a perimeter of the container 106 or in any other arrangement suitable for retaining items 104 within the container. The sidewalls 208 can attach to the base 210 and extend upwards to a height. The sidewalls 208 can include a proximal sidewall (e.g., a sidewall 208 positioned closest to the chute 108 and the proximal side of the container receiving area 112) and a distal sidewall (e.g., a sidewall positioned furthest away from the chute 108 and closest to the distal side of the container receiving area 112). The height can be less than the height at which the chute 108 is attached to the support structure 110. The base 210 can be more rigid (e.g., include a more rigid material) than the sidewalls 208. For example, the base 210 can include a structure (e.g., a pallet) which can support the weight of the items 104 when the filled container 106 is moved (e.g., around the warehouse environment 101).

The chute 108 can be attached to the support structure 110 such that items 104 can fall off of the chute 108 into the containers 106 when the containers 106 are positioned in the container receiving area 112. The chute 108 can be attached to a horizontal support 204a of the support structure 110. For example, the chute 108 can be attached to a horizontal support 204a that positions the bottom of the chute 108 above the top of the containers 106. The chute 108 can include an item-receiving surface 212 and guides 214. The guides 214 can prevent the items 104 from falling off the chute 108 and falling outside the containers 106. For example, the guides 214 can be spaced apart a similar distance as the open side of the containers 106.

The item-receiving surface 212 can be sloped (e.g., angled) such that a leading edge 216 is higher than a trailing edge 218. The slope of the chute 108 can aid in the items 104 sliding down the chute 108 (e.g., from the leading edge 216 to the trailing edge 218). The item-receiving surface 212 can be or include material that aids the items 104 sliding down the chute 108. For example, the receiving surface can be or include low-friction material.

In various embodiments, the trailing edge 218 can be substantially horizontal. The substantially horizontal portion can change the trajectory of the items 104 when the items 104 fall off of the chute 108. For example, as discussed in reference to FIG. 6, the substantially horizontal portion of the trailing edge 218 can cause the items 104 to have an arc trajectory. For example, the items 104 can travel a short distance at a substantially horizontal direction before falling in a vertical direction. The trailing edge 218 can be substantially aligned with the distribution device 102 (e.g., aligned along the same plane). The chute 108 (e.g., the trailing edge 218) can cause some of the items 104 to have a trajectory that intersects with the flexible member 114. For example, the characteristics of certain items 104 can cause those items 104 to travel a distance along a substantially horizontal plane until the items 104 contact the flexible member 114. The flexible member 114 can deflect the items 104 and change the trajectories of those items 104. Changing the trajectories of some of the items 104 can more evenly distribute the items 104 in the containers 106 than if the flexible members 114 were absent.

In various embodiments, the container filling system 100 can include a sensor 220. The sensor 220 can be positioned to detect the height of the items 104 in the containers 106. For example, the sensor 220 can be oriented to detect the height of the items 104 in the containers 106. When the items 104 are detected to be above a predetermined threshold, the sensor 220 can send a signal to a processor (e.g., via a signal generator 222). The processor can stop the flow of items 104 to the chute 108 and/or can activate a signal generator 222 (e.g., a notification signal). The signal generator 222 can alert a user that the container 106 is filled and should be replaced with an empty container 106.

Figure 3:
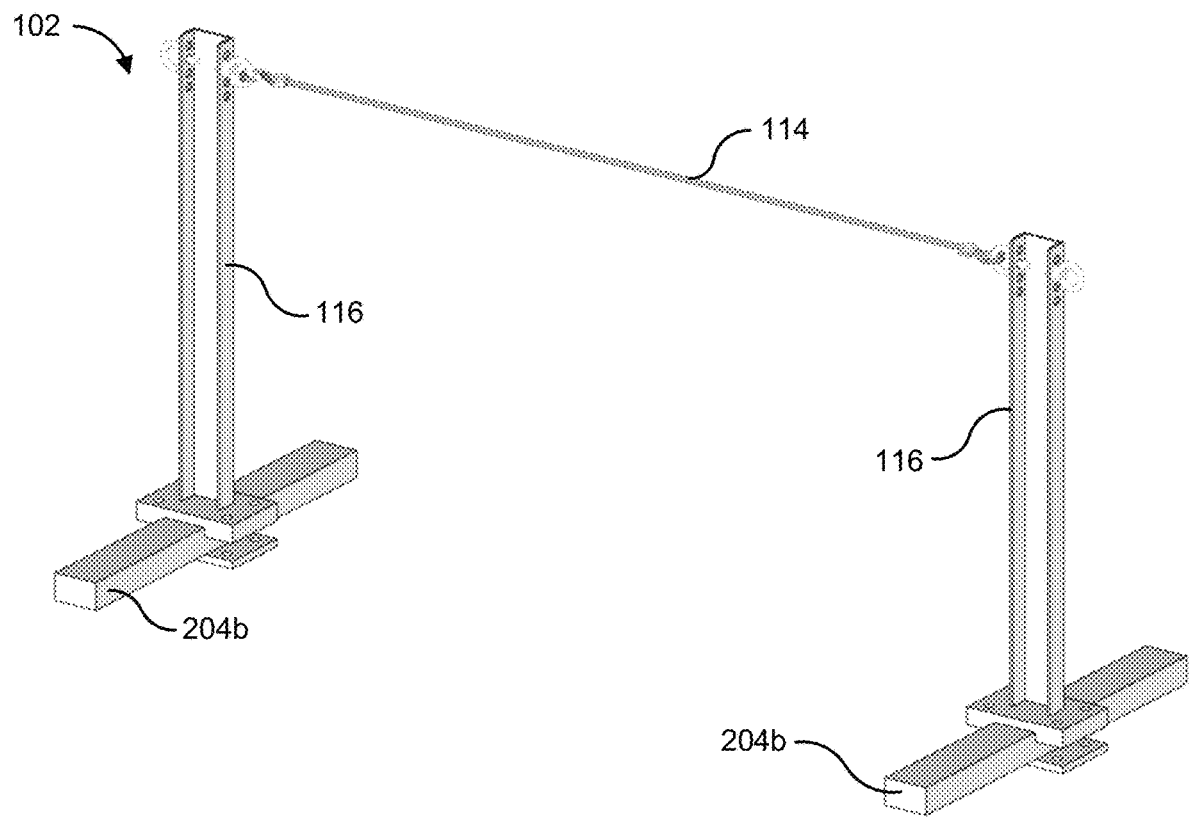
FIG. 3 illustrates a distribution device for use with the container system of FIG. 1, in accordance with various embodiments.
Figure 4:
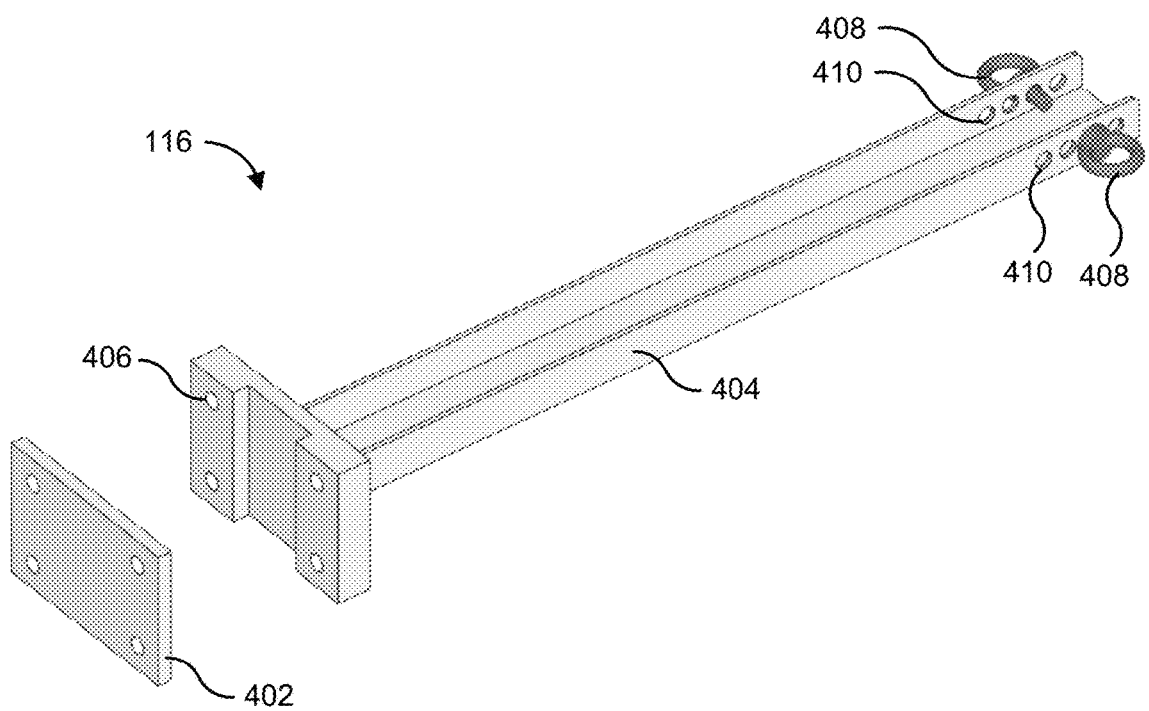
FIG. 4 illustrates a portion of the distribution device of FIG. 3, in accordance with various embodiments.

Turning to FIGS. 3 and 4, an example of distribution device 102 is shown. The distribution device 102 includes an flexible member 114 stretched between two supports 116. The flexible member 114 can be or include nylon, rubber, metal, and/or any suitable elastic material. FIGS. 3 and 4 show the flexible support 114 as a band (e.g., a solid band), however, the flexible support 114 can be or include a chain, links, and/or any suitable form factor. The supports 116 can be attached to the support structure 110 such that the flexible member 114 is positioned above the containers 106 when the containers 106 are positioned in the container receiving area 112. In various embodiments, the supports 116 can be attached to horizontal supports 204b.

As shown in FIG. 4, the supports 116 can include a mounting plate 402 and a support body 404. The mounting plate 402 can be positioned on one side of the horizontal supports 204b and attached to the support body 404, for example, using fasteners extending through mounting holes 406. The fasteners can be tightened until the mounting plate 402 can hold the support body 404 in position (e.g., the mounting plate 402 and the support body 404 can have a clamping force on the horizontal supports 204b). The fasteners can be loosened (e.g., removed) to allow the supports 116 to be moved along the horizontal supports 204b. For example, the fasteners can be loosened to reduce the clamping force and the supports 116 can be moved to a different position.

The support body 404 can include anchors 408 which can connect to the flexible member 114. For example, the flexible member 114 can be attached to an anchor 408 on each of the supports 116. In some embodiments, each of the supports 116 may have multiple anchors 408. However, each of the supports 116 may have a single anchor 408. For example, each of the supports 116 may have an anchor 408 facing towards the center of the container receiving area 112. The anchors 408 can be or include a hook, an eye bolt, a carabiner, an s-hook, a chain link, and/or any suitable device individually, multiply, or in combination that can connect with the flexible member 114.

In various embodiments, the anchor 408 can be moveable (e.g., along the height of the support body 404). The support body 404 can include one or more openings 410 where the anchor can be attached. The anchors 408 can be moved between the openings 410 based on, for example, characteristics of the items 104. The anchors 408 on the opposing supports 116 can be positioned at the same height (e.g., such that the flexible member 114 is generally horizontal). However, the anchors 408 on the opposing supports 116 may be positioned at different heights (e.g., such that the flexible member 114 is angled relative to horizontal).

Figure 5:
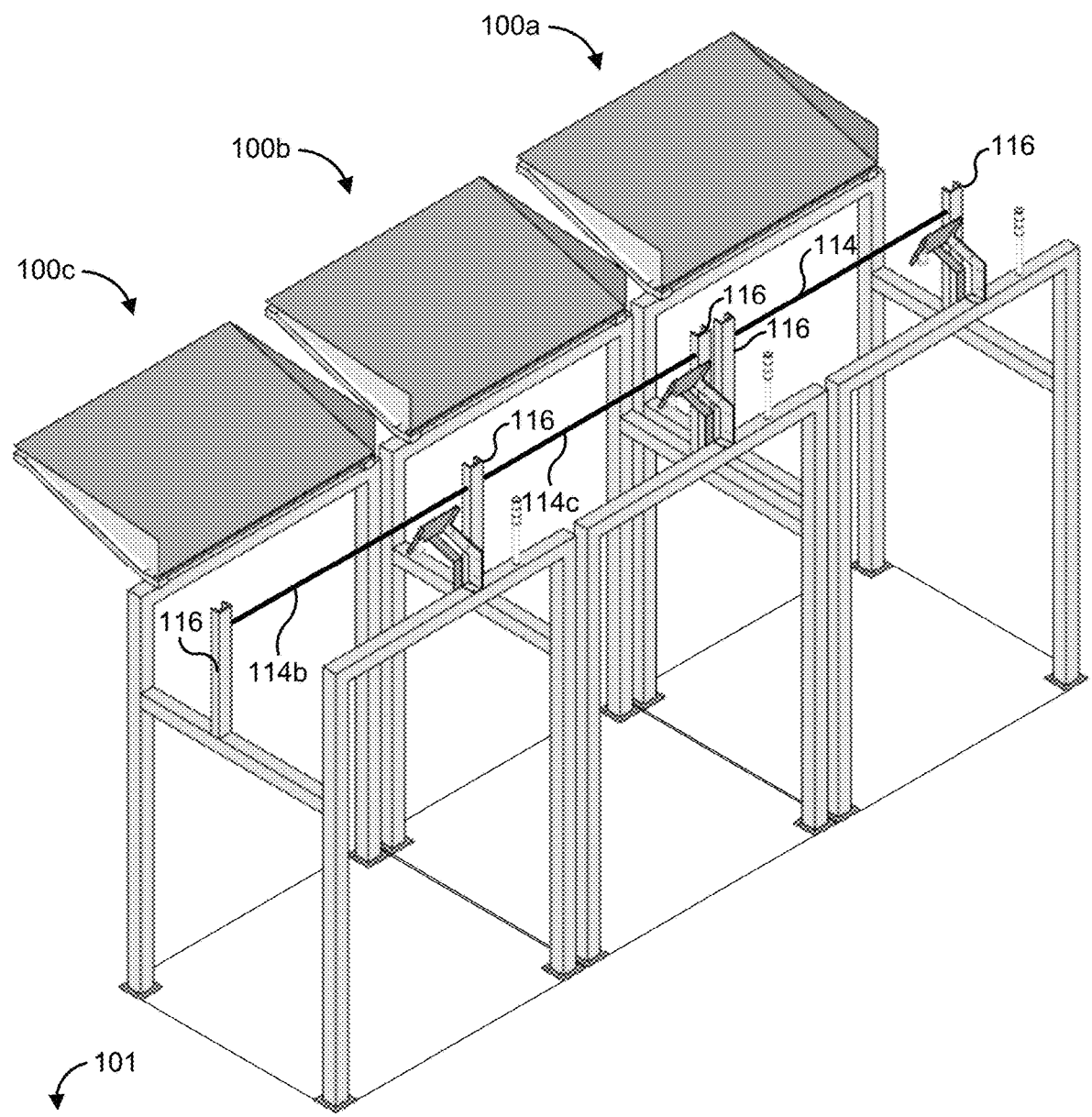
FIG. 5 illustrates multiple container filling systems of FIG. 1, in accordance with various embodiments.

Turning to FIG. 5, multiple container filling systems 100 can be positioned next to one another in a warehouse environment 101. For example, as shown in FIG. 5, three container filling systems 100 are shown positioned next to one another. Each of the container filling systems 100 can have their own separate components, however, the container filling systems 100 can share one or more components. For example, container filling system 100a as depicted is independent without sharing components with the container filling systems 100b and 100c. However, the container filling systems 100b and 100c can share a support 116 where multiple flexible members 114 are connected (e.g., flexible members 114b and 114c).

Figure 6:
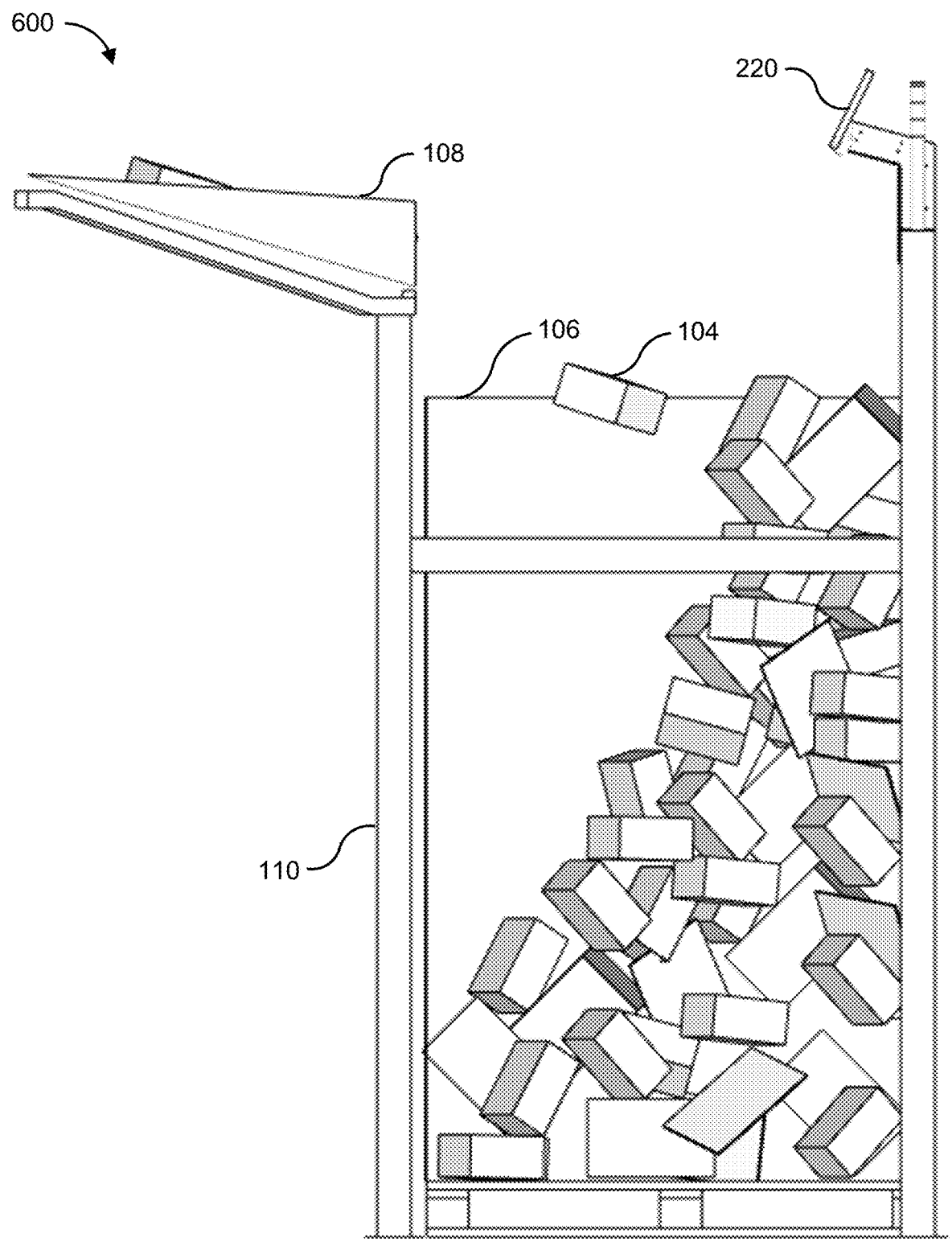
FIG. 6 is an example of a filling system implemented without a distribution device, in accordance with various embodiments.

Turning to FIG. 6, an example of a known filling system 600 implemented without a distribution device 102 is shown. The items 104 fall from the chute 108 into the container 106. However, due to the characteristics of the items 104, the items 104 can have similar trajectories. The similar trajectories carry the items 104 to a far side of the containers 106. The items 104 can stack up on the far side of the containers 106 and can cause the sensor 220 to detect that the containers 106 are full. However, because the items 104 have stacked underneath the sensor 220, the containers 106 are actually semi-full and the sensor 220 has detected a false full. The false full detection can cause semi-full containers 106 to be moved and reduce the efficiency of the filling system 600.

Figure 7:
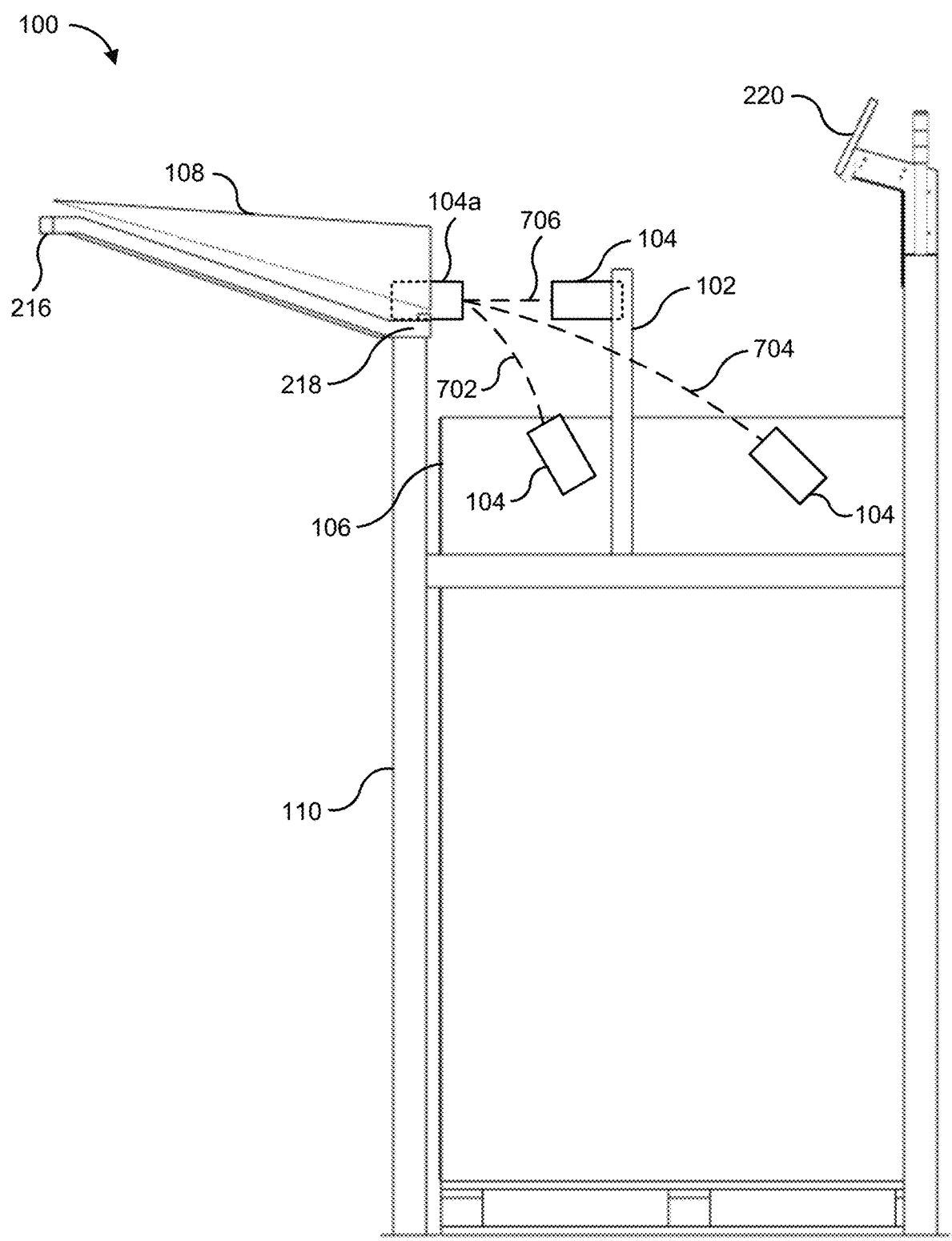
FIG. 7 is a side view of the container filling system of FIG. 1, in accordance with various embodiments.

FIG. 7 is a side view of the container filling system 100 including a distribution device 102. FIG. 7 further shows the possible trajectories 702, 704, and 706 of an item 104 falling off of the chute 108 into a container 106. The item 104 can travel down the chute 108, for example, from the leading edge 216 to the trailing edge 218. The trailing edge 218 can be horizontal such that the item 104 has a trajectory that arcs from the chute 108 to the container 106. The trajectory of the item 104 can depend on one or more characteristics of the item 104. For example, the size, shape, orientation, weight, surface finish, spin, and/or speed of the item 104 traveling down the chute 108 can affect the trajectory of the item 104. As a first illustrative example, the item 104 can follow trajectory 702 and fall into the container 106 on the near side of the container 106. The item 104 can follow trajectory 702 if, for example, the item 104 is heavy and/or the speed of the item 104 is slow down the chute 108. As a second illustrative example, the item 104 can follow trajectory 704 to the far side of the container 106. The item 104 can follow trajectory 704 if, for example, the item 104 is light and/or the speed of the item 104 is fast down the chute 108. As a third illustrative example, the item 104 can follow trajectory 706 which is intersected by distribution device 102. As discussed further in reference to FIGS. 8A through 9D, the distribution device 102 can change the trajectory 706 of the item 104. For example, if the item 104 continued to follow trajectory 706 without contacting distribution device 102, the item 104 may land on the far side of the container 106. However, the distribution device 102 changing the trajectory 706 can cause the item 104 to land on the near side of the container 106.

Changing the trajectory of items 104 that are similar to trajectory 706 can more evenly distribute items 104 in the container 106. For example, as shown in FIG. 6, the majority of items 104 may have trajectories that predispose the items 104 to land in the far side of the containers 106. However, by changing the trajectories of some of those items 104, the items 104 can be more evenly distributed in the container (e.g., some of the items 104 are redirected to the near side of the container 106 instead of landing in the far side of the container 106). The items 104 being more evenly distributed in the containers 106 can allow the containers 106 to be filled more completely and reduce or prevent the sensor 220 from detecting a false full condition. For example, the items 104 can be more evenly distributed between the near side and the far side of the container 106 such that when the far side of the container 106 is detected as being filled, the near side and the middle of the container 106 are similarly filled.

FIGS. 8A through 9D illustrate examples of how a container filling system 100 with a distribution device 102 can change the trajectory of the items 104 before the items 104 fall into a container 106. FIGS. 8A through 8D are top views of the container filling system 100 and FIGS. 9A through 9D are side views of the container filling system 100.

Figure 8A:
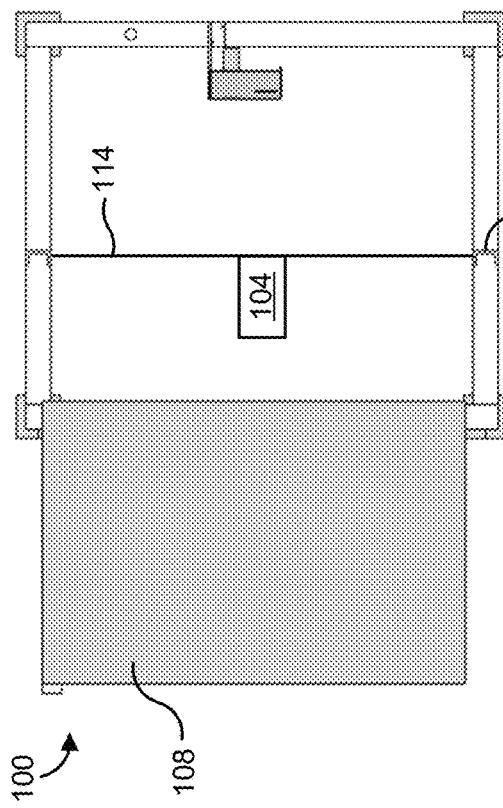
FIGS. 8A through 8D are top views of the container filling system of FIG. 1 illustrating movement of an item, in accordance with various embodiments.
Figure 8B:
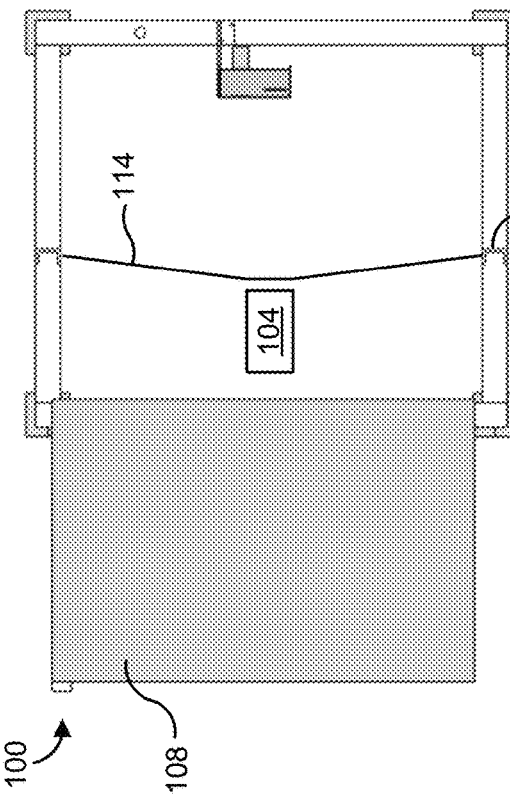
Figure 8C:
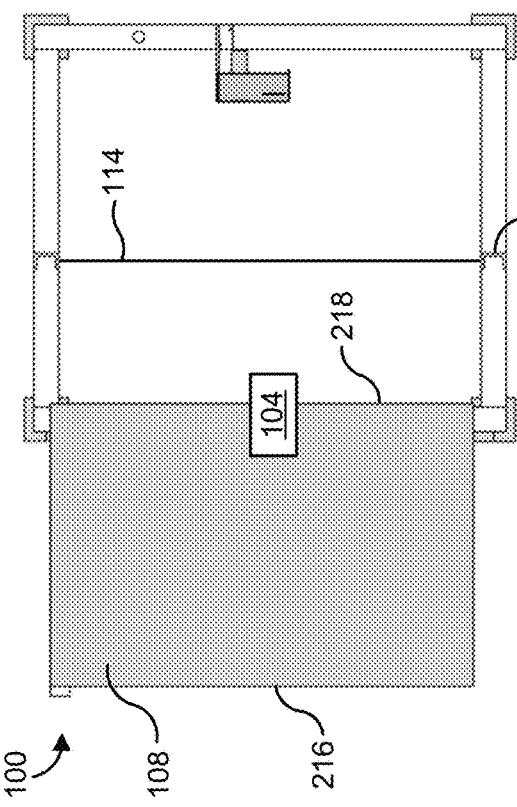
Figure 8D:
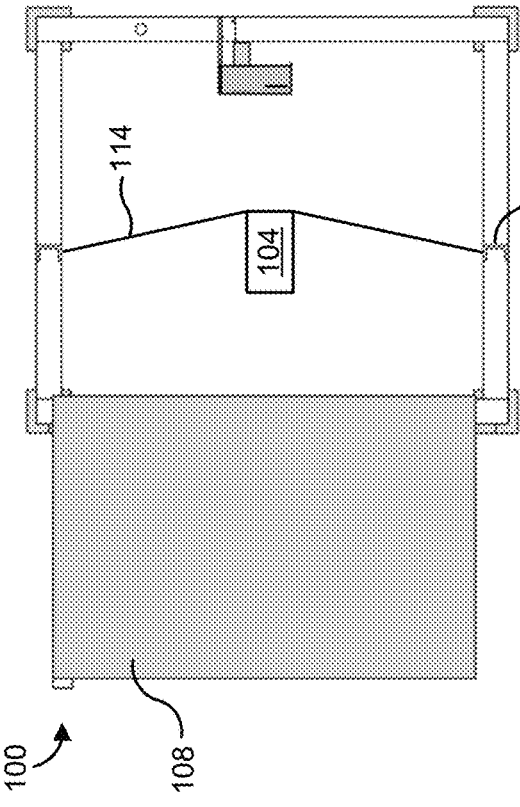
Figure 9A:
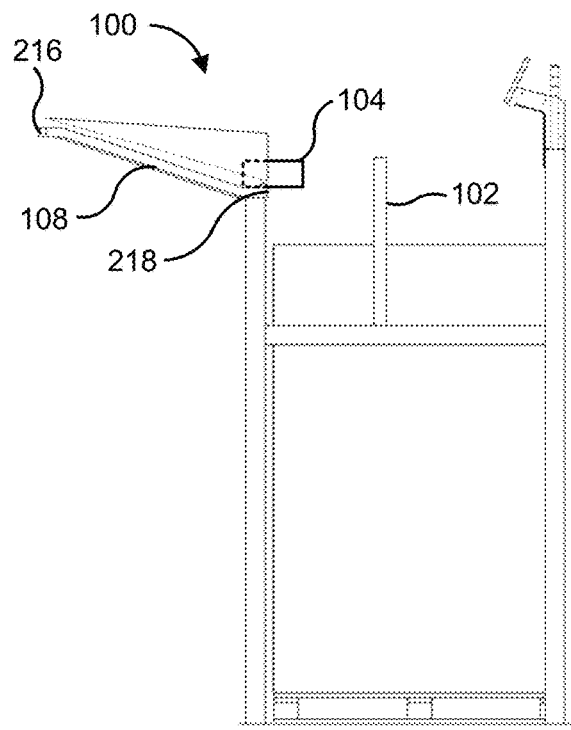
FIGS. 9A through 9D are side views of the container filling system of FIG. 1 illustrating movement of an item, in accordance with various embodiments.
Figure 9B:
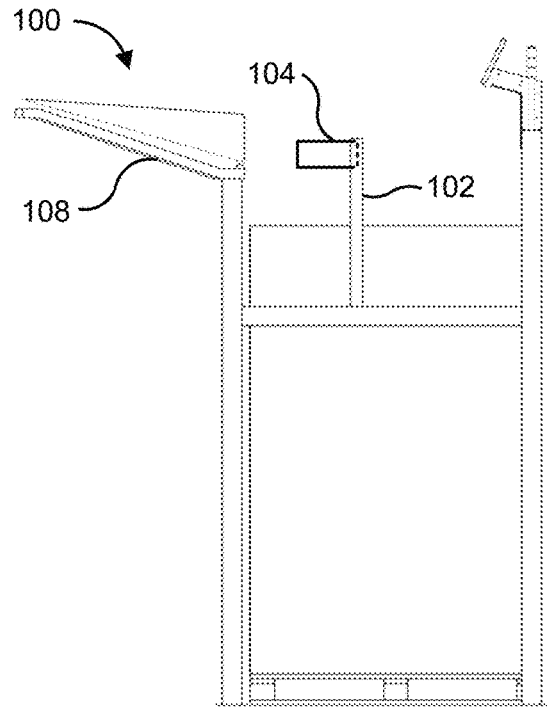
Figure 9C:
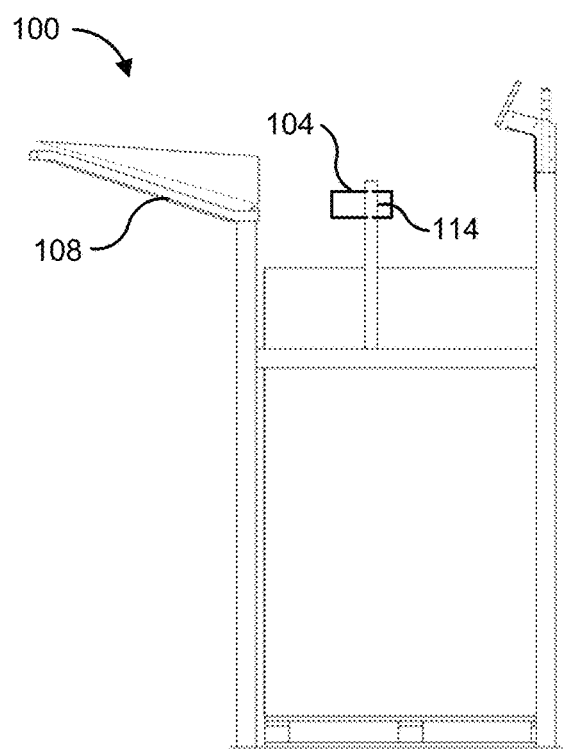
Figure 9D:
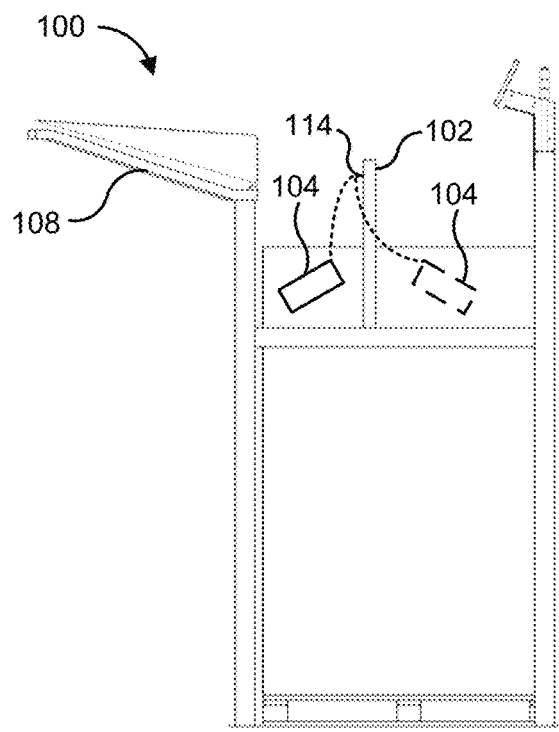

FIGS. 8A and 9A show the item 104 on the chute 108. For example, this state may correspond to a condition after the item 104 has slid from the leading edge 216 to the trailing edge 218. FIGS. 8B and 9B show the item 104 after the item 104 has left the chute 108 and has followed a trajectory to engage with the flexible member 114. As shown in FIG. 9B, the trajectory can be substantially flat such that the item 104 travels along a substantially horizontal plane before contacting the flexible member 114. As shown in FIGS. 8C and 9C, the items 104 can contact the flexible member 114 and cause the flexible member 114 to flex. The flexible member 114 can flex, for example, until the item 104 has been stopped and/or the flexible member 114 has stretched to the elastic limit. As shown in FIGS. 8D and 9D, the flexible member 114 can flex back (e.g., beyond the starting position) to change the trajectory of the item 104. As shown in FIG. 9D, the trajectory of the item 104 can be changed such that the item 104 falls on the near side of the container 106 (e.g., as shown by item 104 in solid lines). However, the trajectory of the item 104 may be changed such that the item falls on the far side of the container 106 (e.g., as shown by item 104 in dashed lines). The item 104 may spin or tumble as a result of contact with the flexible member 114, for example. More generally, the trajectory of the item 104 after leaving the flexible member 114 may continue toward the far side (e.g., as shown by example with item 104 in dashed lines) or may at least partially reverse direction to return toward the near side (e.g., as shown by example with item 104 in solid lines) The trajectory of the item 104 after leaving the flexible member 114 can depend on characteristics of the item 104.

Figure 10A:
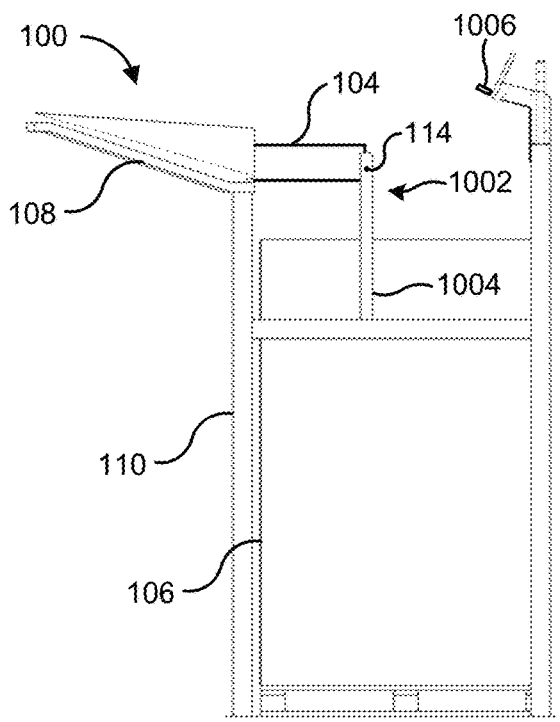
FIGS. 10A through 10C illustrate the container filling system of FIG. 1 including a moveable distribution device, in accordance with various embodiments.
Figure 10B:
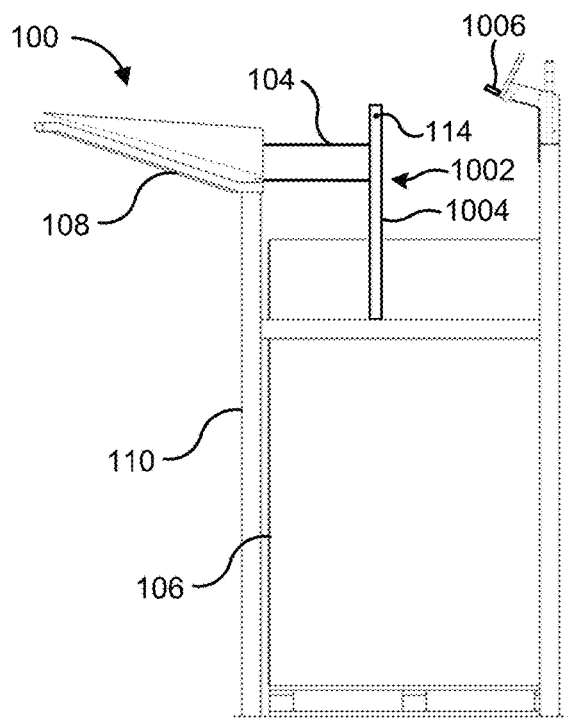
Figure 10C:
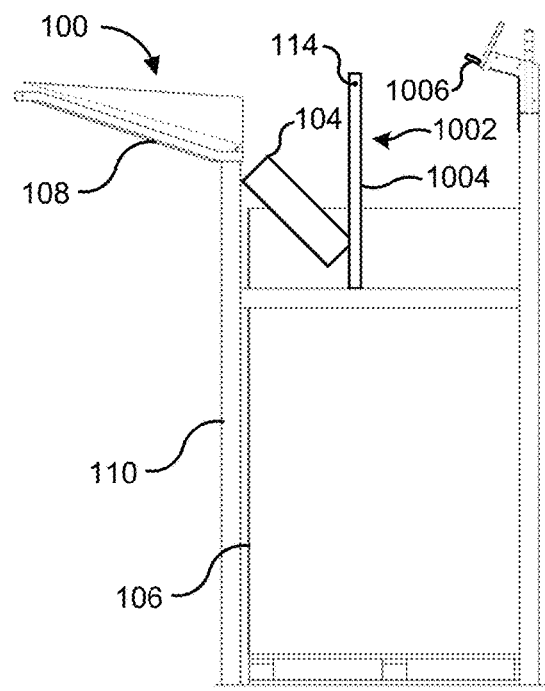

FIGS. 10A through 10C illustrate a container filling system 100 including a moveable distribution device 1002. The moveable distribution device 1002 can include a moveable support 1004 (e.g., an adjustable support) and a flexible member 114. The moveable support 1004 can be moved, for example, along a vertical direction. The moveable support 1004 can be or include an actuator and/or suitable actuation device. The moveable distribution device 1002 can be set at a starting height to receive items 104 (e.g., the moveable distribution device 1002 can be set such that the flexible member 114 is generally aligned with the bottom of the chute 108).

The moveable distribution device 1002 can be moved between positions based on the location of one or more items 104. In various embodiments, a sensor 1006 (e.g., when may be coupled with the support structure 110 or otherwise positioned for a suitable field of view) can be used to detect a location of items 104. For example, as shown in FIG. 10A, an item 104 can be stuck between the chute 108 and the moveable distribution device 1002 (e.g., the item 104 can be larger than the distance between the end of the chute 108 and the flexible member 114). The item 104 can be stuck between the chute 108 and the moveable distribution device 1002 such that the item 104 is prevented from falling in the container 106 and/or can block other items 104 from falling into the container 106.

The sensor 1006 can detect that the item 104 is stuck and send a signal that the moveable distribution device 1002 should move, for example, to allow the item 104 to fall into the container 106. As shown in FIG. 10B, the moveable support 1004 can move (e.g., extend) in a vertical direction. Movement of the moveable support 1004 can change the position of the flexible member 114 such that the flexible member 114 is positioned above the item 104. However, the moveable support 1004 can also be lowered to position the flexible member below the item 104. Or move in a horizontal or other direction suitable for adjusting associated spacing to allow the item 104 to drop into the container 106.

As shown in FIG. 10C, moving the moveable distribution device 1002 can allow the item 104 to fall into the container 106. For example, the moveable distribution device 1002 can move the flexible member 114 above the item 104 and allow the item 104 to fall into the container 106. The sensor 1006 can detect that the item 104 is no longer stuck (e.g., has fallen into the container 106) and can send a signal that the moveable distribution device 1002 can return to the starting height. The moveable support 1004 can move the flexible member 114 to the starting height to receive additional items 104.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A container filling system comprising:
   a frame defining a container receiving area, the container receiving area including a proximal side and an opposing distal side separated by at least a middle area;
   a container positionable in the container receiving area between the proximal side and the distal side, the container having sidewalls defining an interior volume for receiving items, the sidewalls comprising a proximal sidewall positionable adjacent to the proximal side of the container receiving area and a distal sidewall positionable adjacent to the distal side of the container receiving area;
   a chute positioned adjacent to the proximal side of the container receiving area and coupled with the frame at a height that is greater than a height of the container, the chute configured to deposit items into the interior volume of the container when the container is positioned in the container receiving area, the items having differing trajectories from the chute into the interior volume of the container according to differing characteristics of the items; and
   a distribution device comprising an elastic band mounted to supports coupled with the frame, the elastic band extending between the supports such that a lowermost part of the elastic band is positioned above and overhead to the middle area of the container receiving area, the elastic band arranged to intersect some of the trajectories for deflection of some of the items toward the proximal sidewall of the container, the elastic band further arranged out of a path of others of the trajectories for allowing travel of others of the items toward the distal sidewall of the container so as to distribute loading in the container between the proximal and distal sidewalls.

2. The container filling system of claim 1, wherein the frame comprises vertical supports extending to a height above the height of the container and horizontal supports extending between the vertical supports.

3. The container filling system of claim 2, wherein the vertical and horizontal supports define one or more openings through which the container can be positioned in the container receiving area.

4. The container filling system of claim 1, wherein the chute has an item-receiving surface having a downward slope from an upper edge to a lower edge.

5. The container filling system of claim 4, wherein the lower edge of the chute is aligned with the elastic band.

6. The container filling system of claim 1, further comprising a sensor configured to detect a height of the items in the container.

7. A container filling system comprising:
   a support structure defining a container receiving area configured to receive a container having an interior volume into a received state within the container receiving area;
   a chute coupled with the support structure, the chute configured to deposit items into the interior volume when the container is in the received state, the items having trajectories from the chute into the interior volume in the received state; and
   a distribution device coupled with the support structure and positioned such that a lowermost part of the distribution device is positioned above and overhead to a middle portion of the container receiving area, the distribution device configured to change the trajectories of a portion of the items prior to the items falling into the interior volume in the received state.

8. The container filling system of claim 7, wherein the distribution device comprises supports coupled with the support structure and a flexible member extending between the supports and positioned above the container receiving area.

9. The container filling system of claim 7, wherein the support structure comprises a frame having vertical supports extending to a height above a height of the container when the container is positioned in the container receiving area.

10. The container filling system of claim 7, wherein the container comprises sidewalls extending from a base.

11. The container filling system of claim 7, wherein the chute comprises a sloped surface and guides.

12. The container filling system of claim 11, wherein the chute comprises a lower portion aligned with a portion of the distribution device, the lower portion being horizontal relative to the sloped surface.

13. The container filling system of claim 7, further comprising a sensor coupled with the support structure and configured to detect a height of the items in the interior volume of the container.

14. The container filling system of claim 13, further comprising a signal generator configured to alert a user when the sensor has detected that the items in the container have reached a predetermined height threshold.

15. A distribution device for use in a container filling system having a support structure and a chute coupled with the support structure, the distribution device comprising:
   a flexible member; and
   mounts couplable on differing sides of a support structure that at least partially bounds a container receiving area, the mounts coupleable with the support structure into a position configured to support the flexible member at a suitable position in which a lowermost part of the flexible member is above and overhead to a middle area of a container when the container is received within the container receiving area in position for receiving items into an interior volume of the container, the items following differing trajectories into the interior volume according to differing characteristics of the items, wherein the flexible member is configured to change the trajectories of a portion of the items prior to the items falling into the interior volume of the container.

16. The distribution device of claim 15, wherein the mounts comprise one or more anchors configured to connect to the flexible member.

17. The distribution device of claim 16, wherein the anchors comprise one or more of a hook, an eye bolt, an s-hook, a carabiner, or a chain link.

18. The distribution device of claim 16, wherein the anchors are moveable from a first position to a second position along a height of the mounts.

19. The container filling system of claim 15, wherein the flexible member is configured to move from a neutral position in response to items contacting the flexible member.

20. The distribution device of claim 15, wherein the mounts are moveable from a first position to a second position on the support structure.

* * * * *